United States Patent [19]
Stannard

[11] 3,945,108
[45] Mar. 23, 1976

[54] CORE INSERTER FOR FILTERS

[75] Inventor: Charles G. Stannard, East Granby, Conn.

[73] Assignee: Sprinter System of America, Ltd., East Windsor, Conn.

[22] Filed: Sept. 30, 1974

[21] Appl. No.: 510,494

[52] U.S. Cl. ............ 29/450; 29/163.5 F; 29/200 R; 29/211 R; 29/211 M; 29/235; 93/94 M
[51] Int. Cl.² .......................................... B23P 11/02
[58] Field of Search ... 29/163.5 F, 235, 450, 208 D, 29/200 R, 208 R, 208 E, 211 R, 211 M, 211 D; 93/77 R, 94 M, 94 R; 210/493, 457

[56] References Cited
UNITED STATES PATENTS

| | | | |
|---|---|---|---|
| 2,550,070 | 4/1951 | Brecque et al. | 29/163.5 F X |
| 2,731,183 | 1/1956 | Shaw | 53/23 |
| 3,010,867 | 11/1961 | Sannipoli et al. | 29/450 X |
| 3,106,528 | 10/1963 | Burks | 210/493 X |
| 3,315,338 | 4/1967 | Tigges | 29/235 X |

Primary Examiner—Victor A. DiPalma
Attorney, Agent, or Firm—Ostrolenk, Faber, Gerb & Soffen

[57] ABSTRACT

Method and apparatus for repetitive insertion of filter cores into filters in an automatic manner wherein filter elements of closed loop accordion-pleated configuration are fed to the apparatus and accelerated substantially downwardly upon an upright "wand" having a configuration which cooperates with a "squeezer" mechanism to stretch the upper end of a filter element somewhat to enlarge its central opening. A core is dispensed from a hopper to a swingable reciprocating core catcher which positions a core above a filter element previously positioned on the wand. A plunger is timed to move abruptly downwardly thereby forcing the core completely into the enlarged central opening in the filter element, whereupon the wand is abruptly swung generally downwardly to a take-off position to eject the completed assembly into a suitable collection hopper. The above mentioned operations are continuously repeated at a substantially rapid rate.

16 Claims, 18 Drawing Figures

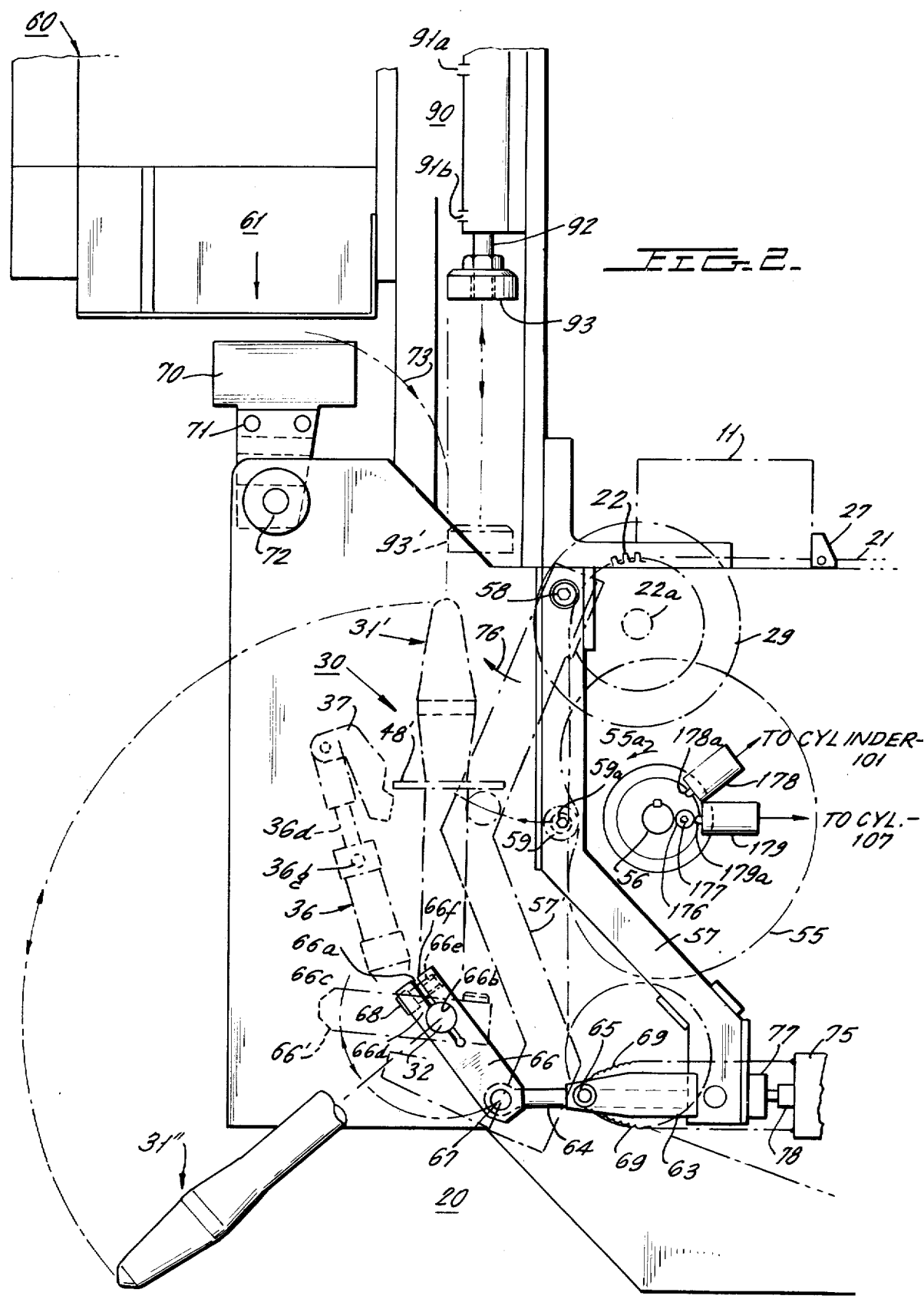

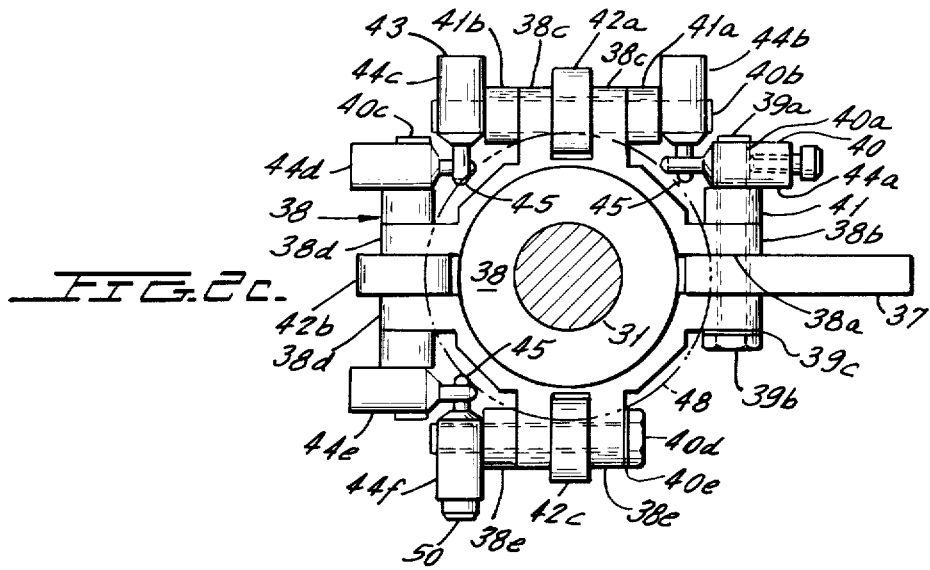
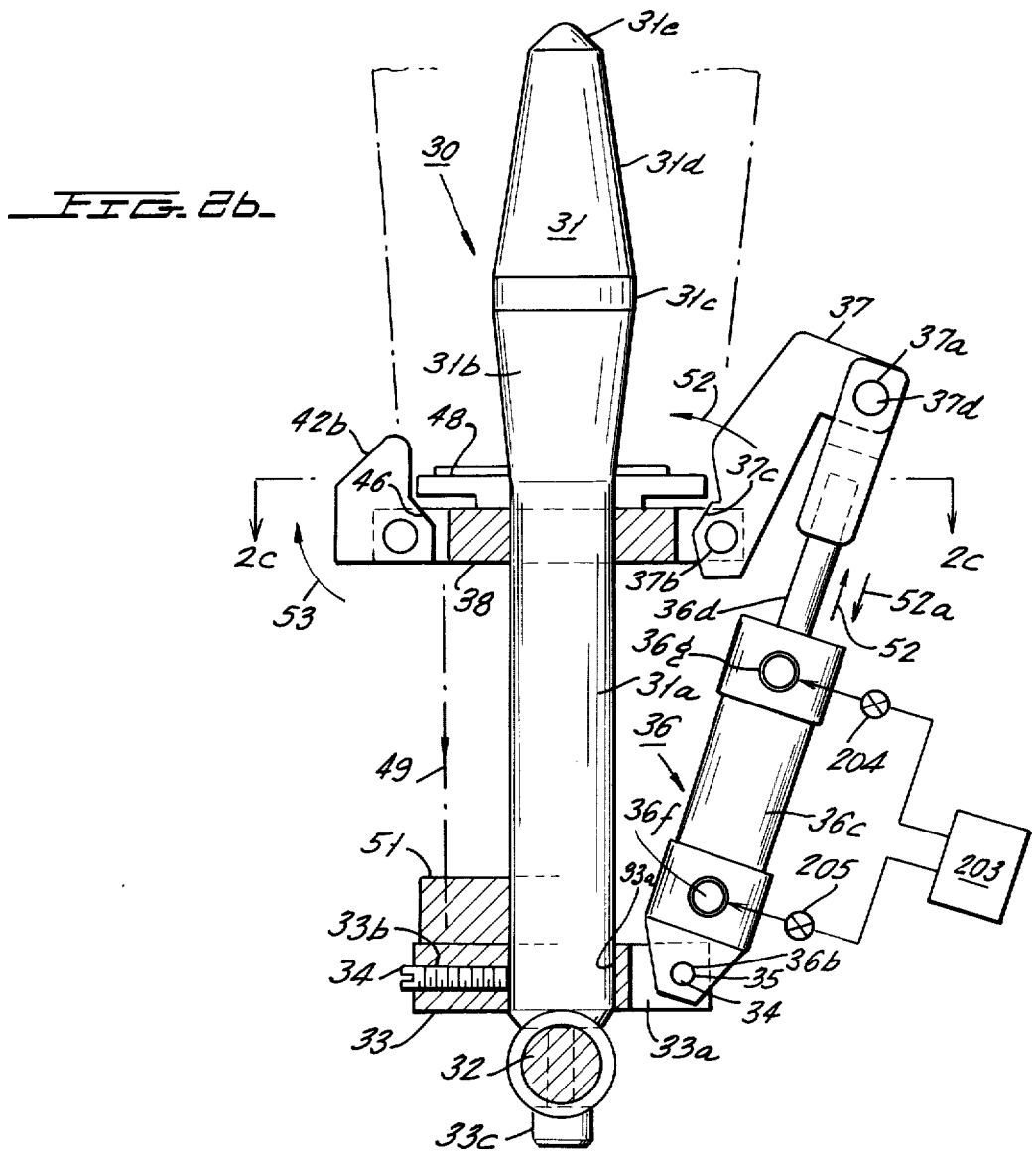

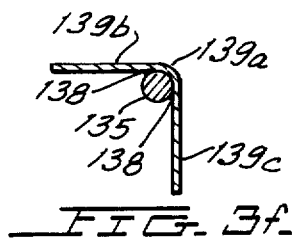
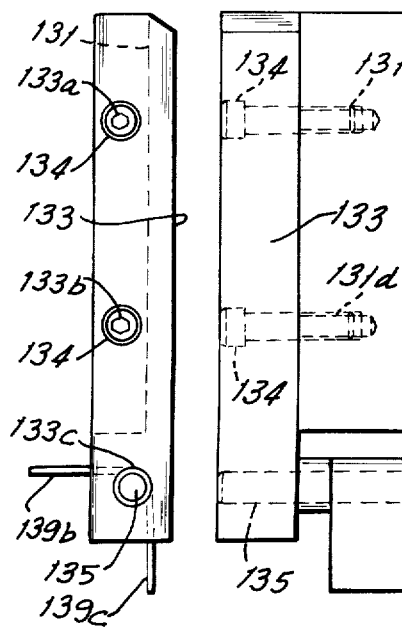
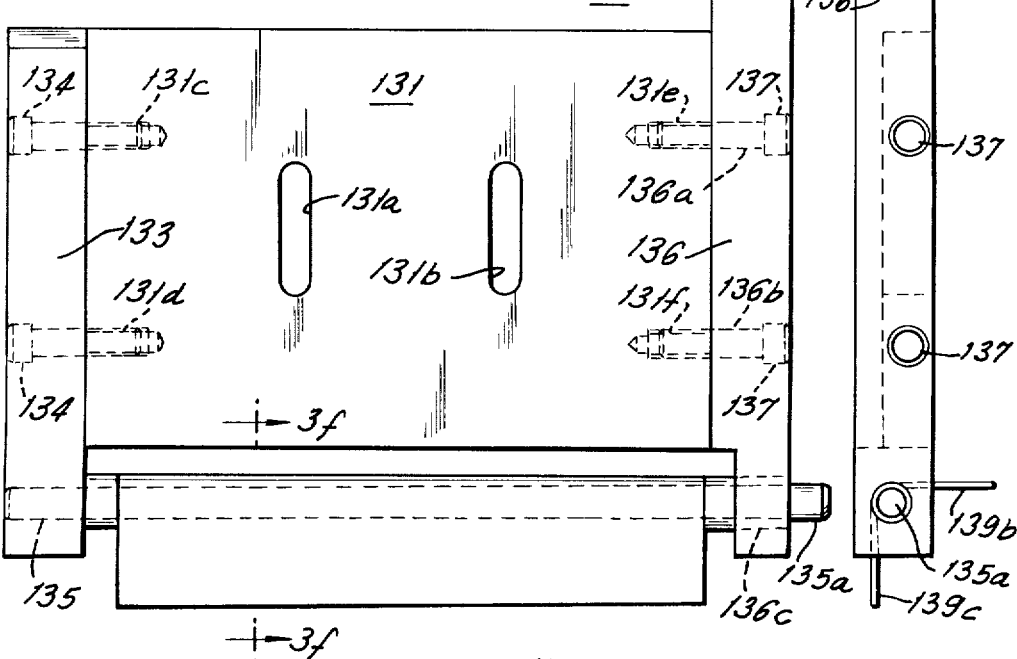
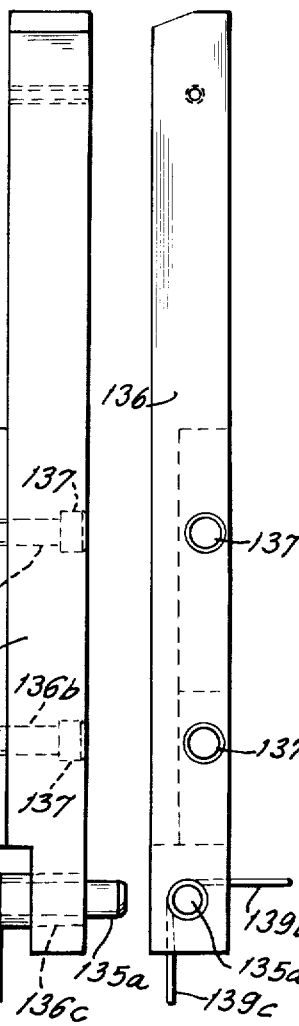
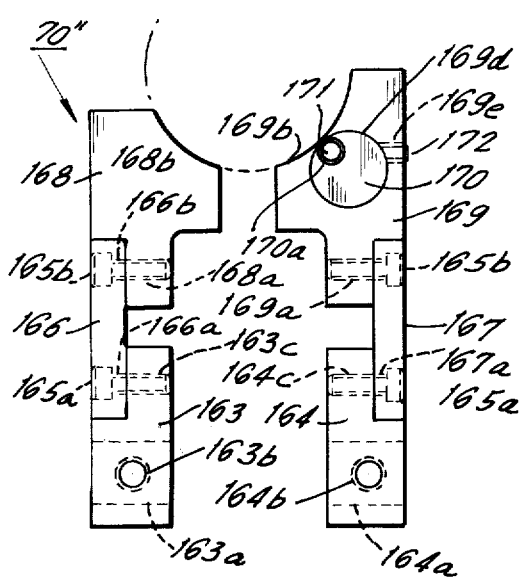
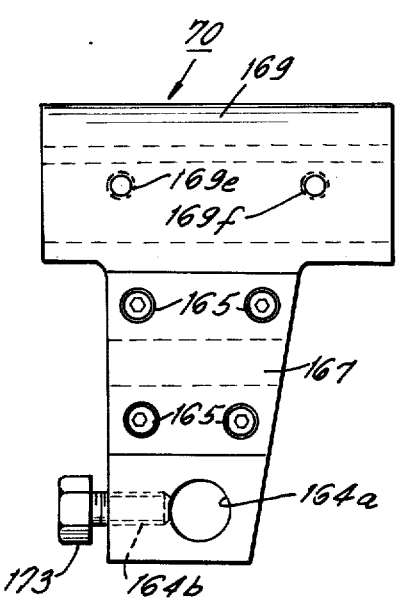
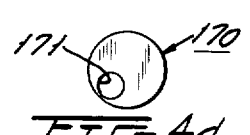
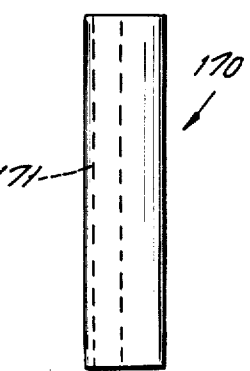

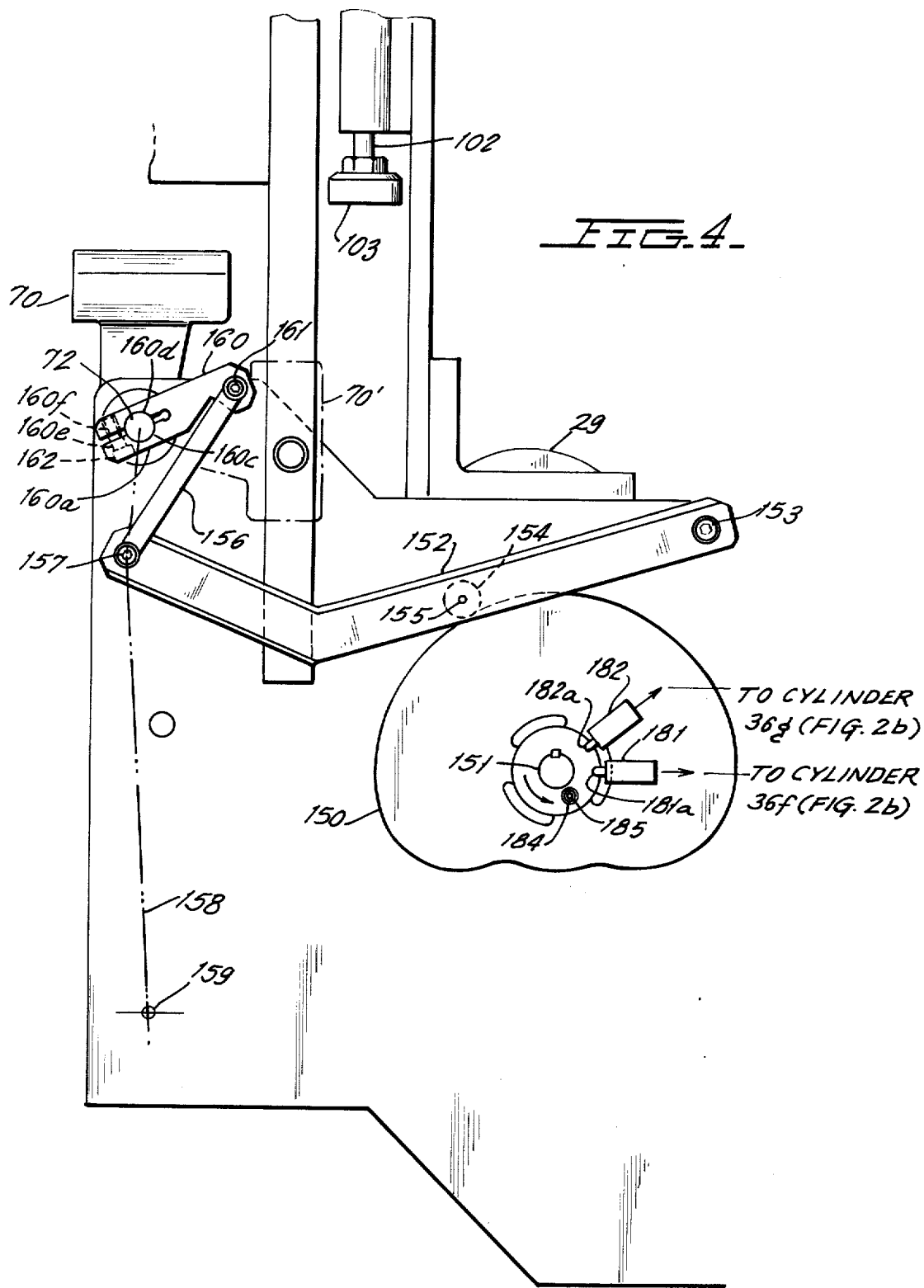

CORE INSERTER FOR FILTERS

BACKGROUND OF THE INVENTION

Oil filters find widespread use in a variety of applications and are typically employed in lubricating systems. For example, in automobile engines, the lubricant (i.e., oil) utilized to lubricate reciprocating engine parts is continuously circulated through a closed-loop path. Oil under circulation and leaving the engine is passed through an oil filter to remove any dirt or contamination therefrom so as to clean the oil prior to returning to the engine. Oil filters are typically comprised of a housing having input and output openings which are respectively coupled between the output and input openings of the lubricating conduits provided in the engine. Such filter means are typically comprised of a cylindrical perforated metallic core inserted within the central opening of a filter element typically having a closed-loop accordion-pleated configuration and being formed of a material having sufficient porosity to permit the passage of oil therethrough while capturing contaminants. A pair of flat, thin disc-shaped end caps are secured to the opposite ends of the filter core which assembly is then inserted into an open-ended housing which typically threadedly engages a mating coupling provided along the engine housing for mounting thereof.

Such filter assemblies are relatively inexpensive.

To date, the insertion of the metallic core into the filter element is performed by a manual operation. With the mounting costs of labor it is thereby extremely desirable to provide a capability of automating the filter assembly steps.

BRIEF DESCRIPTION OF THE INVENTION

The present invention is characterized by providing a fully automated operation for rapidly and reliably inserting core elements into the filter elements.

The apparatus of the present invention is comprised of a pair of conveyor chains adapted to receive completed filter elements which may, for example, undergo assembly through automatic filter-fold apparatus described in copending application Ser. No. 510,221 filed Sept. 30, 1974 and assigned to the assignee of the present invention. Such equipment accepts accordion-pleated filter elements, automatically orients the end flaps into spaced horizontal alignment, deposits a suitable adhesive on at least one of the end flaps and accurately aligns and joins the end flaps and firmly presses the flaps together to form a filter element of closed-loop acordian-pleated configuration.

The completed filter is formed about an arm of a paddle wheel assembly which is adapted, in one preferred embodiment, to be indexed at 90° intervals as the filter surrounding each paddle wheel arm is completed. The outfeed end of the filter-fold apparatus is positioned immediately adjacent the aforementioned pair of chains each having a stripper finger to strip the completed filter element from the paddle wheel arm which has been indexed to the outfeed position. The stripper fingers advance the completed filter element between a pair of rotating acceleration wheels which are adapted to capture a completed filter element therebetween and accelerate and dump the filter element upon the upright end of a wand assembly.

A hopper containing the cylindrical perforated metallic cores is continuously agitated to shake or otherwise move the cores downwardly in the hopper toward the lower end thereof. The hopper is provided with an outfeed opening dimensioned to pass a core therethrough in a predetermined orientation.

A piston-driven reciprocating rotatably mounted feed vane assembly comprised of a swingable "L" shaped vane is positioned at the outfeed opening provided at the bottom of the hopper for dispensing a single core member upon actuation of its air operated piston.

The hopper is provided with a feed ramp communicating with the outfeed end thereof for guiding and directing a dispensed core upon the concave surface of a swingable core catcher. The core catcher is provided with a permanent magnet member of magnetically attracting the core element so as to retain the dispensed core element upon the concave surface of the core catcher. Continuously rotating eccentric cam means and a cooperating follower arm mechanically linked to the core catcher moves the core catcher from the core receiving position downwardly toward the upright wand so as to position the core deposited thereon immediately above the upper enlarged opening of the filter element.

The swingable wand has a central portion of large diameter for receiving the filter element which central portion tapers both upwardly and downwardly. A piston-driven squeezer assembly surrounding said wand and positioned inwardly from the free end thereof is adapted to encircle the lower end of the filter element deposited on the wand and to squeeze the lower end of the filter element encircling the wand. The wide central portion of the wand acts as a fulcrum which causes the opening at the upper end thereof to become enlarged to facilitate insertion of the core element positioned above the filter element by the core catcher.

Thereafter a reciprocating piston-driven core pusher plunger is moved rapidly downwardly to force the core element completely into the filter element.

A second eccentric cam reciprocates a second cam follower arm which is mechanically linked to the wand to cause the upright wand to be rapidly moved to a substantially downwardly directed end take-off position. The wand is moved at an angular velocity sufficient to "snap" the completed filter element with the inserted core off of the wand and into a suitable collection bin whereupon the wand is abruptly and rapidly returned to the upright position preparatory to the next core insertion operation. The automatic apparatus which performs the above operations has the capability of inserting cores into filter elements at a rate of greater than 40 per minute.

BRIEF DESCRIPTION OF THE FIGURE AND OBJECTS

It is therefore one object of the present invention to provide a novel method and apparatus for rapidly and repetitively inserting metallic cylindrical core elements into filter elements in a high speed manner.

Still another object of the present invention is to provide a novel method and apparatus for inserting metallic cylindrical cores into stretchable closed-loop accordion-pleated filter elements comprising the steps of positioning a filter element upon an upright wand; squeezing the bottom of the filter element so as to widen its central opening at the upper end thereof; dispensing a core element and directing the dispensed core element into the widened upper end; rapidly pressing the core element into the filter and swinging the wand downwardly at a high rate of angular acceleration to eject the completed assembly into a collection bin; and rapidly returning the wand to the upright position preparatory to the next insertion operation.

The above as well as other objects of the present invention will become apparent when reading the accompanying description and drawings in which:

FIG. 2 is an elevational view showing a portion of the apparatus of the present invention in greater detail;

FIG. 2b shows a detailed elevational view of the wand assembly of FIG. 2;

FIG. 2c shows a detailed view of the squeezer mechanism of FIG. 2b looking in the direction of arrows 2c—2c;

FIGS. 3c, 3d, 3e and 3f show detailed views of the feed vane assembly of FIG. 3a wherein FIG. 3c shows a left-hand end view of the assembly of FIG. 3d;

FIG. 3d shows a plan view of the feed vane assembly;

FIG. 3e shows a right-hand end view of the assembly of FIG. 3d; and wherein

FIG. 3f shows a sectional view of the feed vane of FIG. 3d taken along the lines 3f—3f;

FIG. 4 shows a detailed elevational view of the core catcher and actuating assembly of FIG. 2; and FIGS. 4a and 4b show detailed end and side views, respectively, of the core catcher of FIG. 2;

FIGS. 4c and 4d show side and end views, respectively, of the magnetic holder bar and magnetic rod of FIGS. 4a and 4b and

DETAILED DESCRIPTION OF THE INVENTION

Figure 1A:
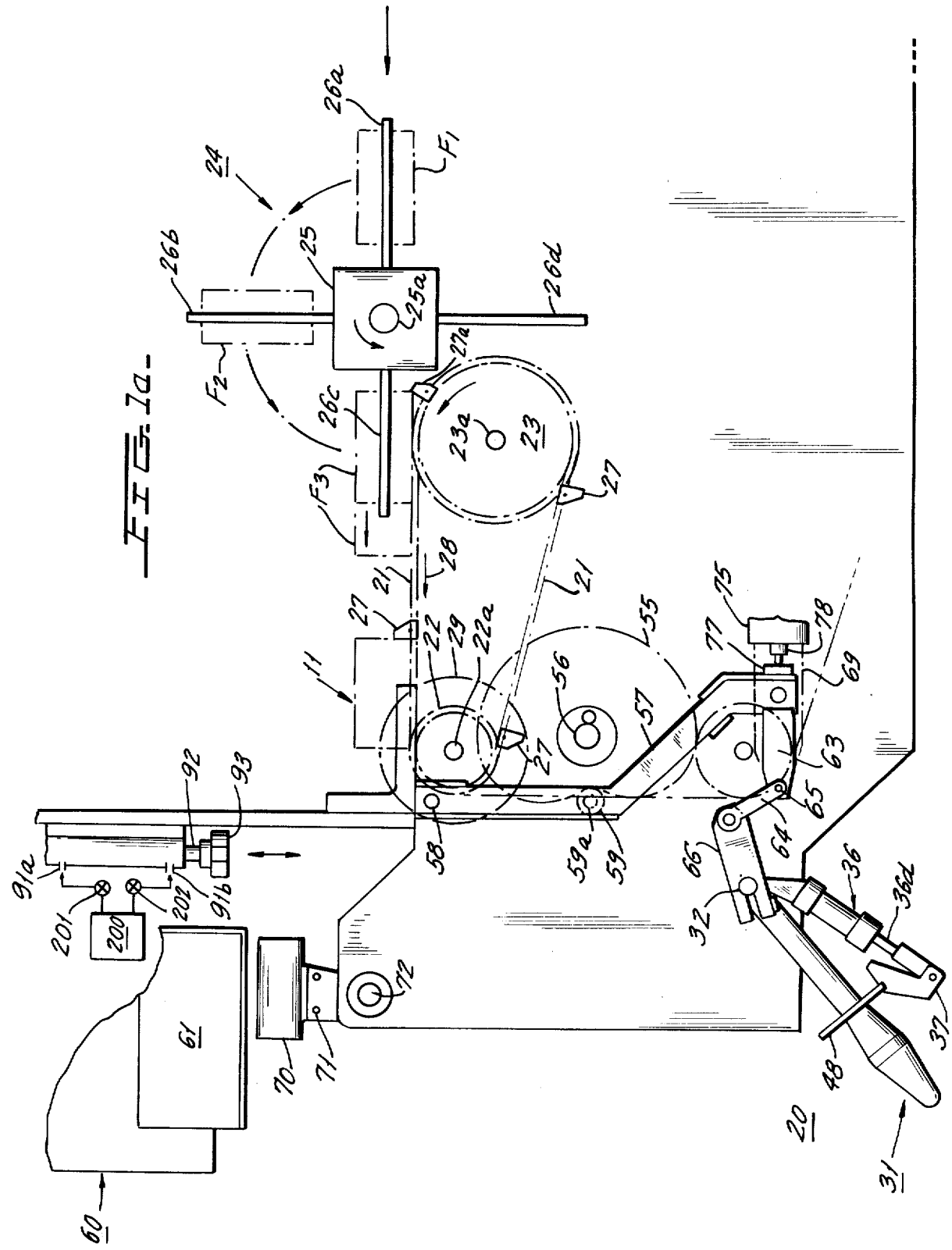
FIG. 1a is a simplified elevational view of the insertion apparatus of the present invention.
Figure 1:
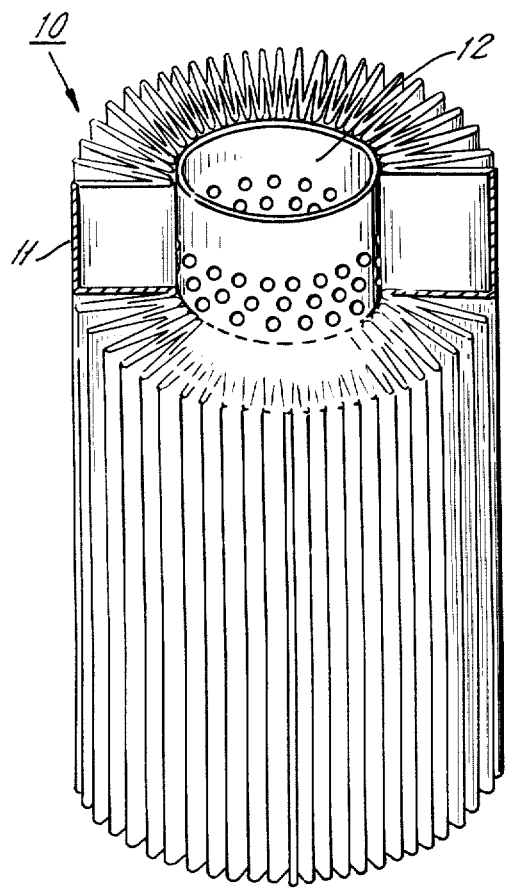
FIG. 1 is a partially sectionalized perspective view of a filter element and core element showing the manner of assembly.

FIG. 1 shows a partially sectionalized perspective view of an oil filter sub-assembly 10 comprised of the filter element 11 and core element 12. The filter element 11 is formed of a suitable substantially stiff, porous filter material folded in an accordion-pleated manner so as to form a closed-loop configuration. Although the filter element is relatively stiff and resists bending in the longitudinal direction, the filter element is nevertheless free to stretch in the radial direction. The center of the filter element is hollow and is adapted to receive a hollow cylindrical shaped perforated metallic core element 12 which serves to support the filter element 11 within an oil filter structure, the other elements of which have been omitted for purposes of simplicity. It is an object of the present invention to provide a method and apparatus for continuously inserting core elements 12 into filter elements 11 in a high speed automated fashion.

Figure 2A:
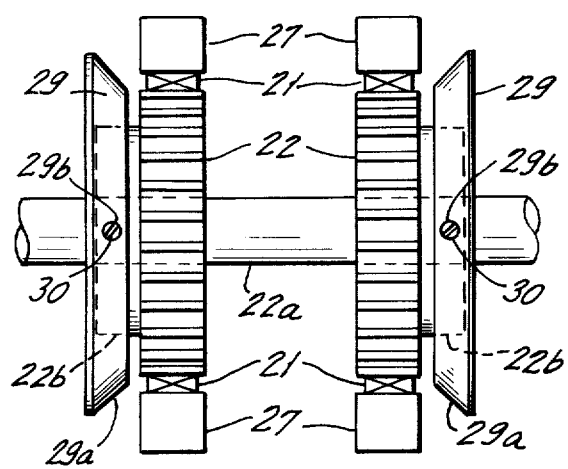
FIG. 2a shows an end view of the accelerator wheel assembly employed in the apparatus of FIG. 2.

FIGS. 1a and 2 show the apparatus of the present invention employed for this purpose and which is comprised of a pair of closed-loop chains 21,21 (see also FIG. 2a) entrained about sprocket assemblies 22 and 23 rotatably mounted about shafts 22a and 23a, respectively. Shaft 23a is continuously rotated to feed filter elements 11 into the core insertion apparatus 20 as will be more fully described.

Although the core insertion apparatus may receive completed filter elements from any one of a variety of input sources, the core insertion apparatus 20 is extremely advantageous for use with the filter-folding and joining apparatus described in the above mentioned U.S. Pat. application Ser. No. 510,221 which apparatus is described in detail in said application and consists of means for joining the end flaps of the filter element to form the annular shaped filter structure 11 of FIG. 1. As shown best in FIG. 1a, paddle wheel assembly 24 forms the output end of the filter joining apparatus and is comprised of member 25 mounted to be rotatably indexed by shaft 25a. Member 25 is provided with a plurality of arms 26a through 26d arranged at 90° intervals. The filter joining operation is performed at the position occupied by arm 26a whereby, upon completion of the filter-folding and joining operation, a completed filter F1 is arranged to encircle arm 26a. Immediately thereafter member 25 is rotated through an angle of 90° in the counterclockwise direction to rotate arm 26a to the position occupied by arm 26b, moving arm 26d to the position occupied by arm 26a in readiness for the next filter-folding and joining operation. Ultimately, arm 26a is indexed to the position occupied by arm 26c. The pair of chains 21 are positioned on opposite sides of arm 26c and are provided with pairs of stripper fingers 27 each mounted to chains 21 by pins 27a. The rotation of shaft 23a in the counterclockwise direction drives stripper chains 21 in the direction of arrow 28 whereby a pair of stripper fingers are moved against the right-hand end of a completed filter F3 to push the completed filter off of arm 26c and downstream along chains 21.

A pair of circular-shaped acceleration wheels 29 are mounted for rotation by shaft 22a. FIG. 2a shows an end elevational view of acceleration wheels 29,29 having beveled edges 29a,29a. Each wheel is secured to the hub portions 22b of sprockets 22 by means of a set screw 30 threadedly engaging radially aligned tapped apertures 29b in the acceleration wheels. Each of the chains 21 engage associated sprockets 22 mounted upon and secured to shaft 22a by set screws 22c and are positioned between the acceleration wheels 29. The stripper fingers 27 push a completed filter between the acceleration wheels causing a portion of the accordion-pleated filter element to be embraced by beveled surfaces 29a.

The acceleration wheels 29 urge a completed filter element along an arcuate path to move each filter from a horizontal alignment toward a vertical alignment. The filter element is "dumped" upon the upper end of an upright wand 31 of a wand assembly 30, shown in detail in FIG. 2b. Wand 31 is an elongated member having a substantially circular cross-section. The lower portion 31a thereof is of substantially constant diameter while the upper portion 31b tapers outwardly to a widened portion 31c which is joined to an upper end portion 31d tapering inwardly rather gradually and ultimately tapering rather significantly to form an upper pointed end 31e.

The lower end 31a of wand 31 is secured to the central portion of a shaft 32 which receives fastener 33c for threadedly engaging a tapped opening in the bottom of wand 31. Both free ends of shaft 32 are journalled within suitable bearings arranged within the machine frame, which frame and bearings have been omitted herein for purposes of simplicity. The wand is arranged to rotate about shaft 32 between the upright position 31', shown in FIG. 2, and a take-off position 31".

Turning again to FIG. 2b, a substantially annular shaped collar 33 has a central opening 33a embracing the lower end 31a of wand 31 and is secured thereto by means of a set screw 34 threadedly engaging a radially aligned tapped aperture 33b in collar 33. Collar 33 is further provided with a radially aligned slot 33c defined by a pair of projections each having an opening arranged on opposite sides of the slot 34 for receiving a shoulder screw 35. The lower end 36a of a piston assembly 36 is provided with an opening 36b which is aligned with the openings in collar 33 and which is adapted to be pivotally mounted to collar 33 by means of shoulder screw 35. A pair of piston assemblies 36 are each comprised of a cylinder 36c having a piston mounted therein (not shown for purposes of simplicity) and integrally joined to a piston rod 36d whose upper end is provided with an opening coaligned with an opening 37a in pivot arm 37. Arm 37 is pivotally linked to the upper end of piston rod 36d by a pin member 37d.

The opposite end of arm 37 is provided with an opening 37b which is positioned within the slot 38a of a substantially annular shaped collar 38, shown best in FIGS. 2b and 2c and locked to wand 31 by any suitable means. Projections 38b on opposite sides of slot 38a are provided with coaligned openings which receive bolt 39a and nut 39b to pivotally join arm 37 to collar member 38. A spacer 41 is positioned adjacent one of the projections 38b on collar 38 to maintain pawl 40, having an opening 40a for receiving bolt 39a, a spaced distance from its adjacent projection. Bolts 39a and 40d are locked in place by retainer rings 39c and 40e.

Collar member 38 is provided with four pairs of spaced projections 38b–38e each extending outwardly and each provided with aligned openings for receiving mounting fasteners. Fingers 42a–42c are positioned between each pair of spaced fingers 38c–38e, as shown best in FIG. 2c.

Each of the pairs of projections 38c–38e is adapted to receive a fastener 40b–40d which is inserted through openings in an associated pair of spaced projections and through an opening in one of the associated fingers 42a–42c. Fastener 40b, for example, also pivotally supports a pair of pawls 44b and 44c each having a central opening for receiving fastener 40b and spaced from projections 38c by spacers 41a and 41b, respectively. Fastener 40c pivotally mounts pawls 4d and 44e while fastener 40d pivotally mounts pawl 44f. Each pawl is provided with an inwardly extending cylindrical projection 45 having a rounded nose at its inner free end.

Each of the fingers 42a, 42b and 42c are substantially identical to one another. FIG. 2b shows finger 42b as having an inclined surface portion 46 arranged to slidably engage the lower peripheral edge of a platform comprised of a cylindrical collar 48 rigidly mounted to constant diameter portion 31a of wand 31. Pivotal arm 37 is provided with a similar inclined surface 37c which similarly engages the lower peripheral edge of cylindrical platform 48.

As was described hereinabove, acceleration wheels 29 (see FIG. 2a) dump a completed filter element upon wand 31. The inner diameter of the central opening in the filter element is greater than the outer diameter of portion 31c of wand 31 so as to be readily telescopingly mounted upon the wand. Platform 48 supports the lower end of the filter element. Collar 38 is slidably mounted about the constant diameter portion 31a of wand 31. The outer end of pawl 44f is secured to one end of a tension spring 49, shown in phantom line fashion in FIG. 2b, and having its upper end mounted to the outer end 50 of pawl 44f and its lower end secured to resilient bumper member 51 which is provided with a semi-circular groove for partially encircling the constant diameter portion 31a of wand 31. Bumper 51 is secured to collar 33 by suitable fastening means.

Wand assembly 30 operates to enlarge the opening of the filter element delivered thereto in the following manner:

Acceleration wheels 29 dump a filter element onto the upper end of wand 31 so that the lower end of the filter is supported by platform 48. Piston assembly 36 is activated to drive piston rod 36d in a direction shown by arrow 52. This causes the beveled surfaces of the fingers 42 (see the beveled surface 46 of FIG. 2b) to move toward the lower peripheral edge of platform 48. Similarly, beveled surface 37c of arm 37 moves toward the lower peripheral edge of platfrom 48 as the elements 42 and the arm 36 rotate in a direction shown by arrows 52 and 53 of FIG. 2b, thereby causing the inwardly directed projection of pawls 44a–44f to move into engagement with portions of the filter elements supported by platform 48. This causes the lower end of the filter element to be "squeezed" together. Section 31c of wand 31 acts as a fulcrum simultaneously causing the upper end of the filter element to move radially outward so as to enlarge the central opening thereof preparatory to receiving a core element.

Turning to a consideration of FIG. 2, cores of the type shown by core element 12 of FIG. 1 are stored in a hopper 60 and dispensed one at a time from an outfeed opening 61 so as to be deposited within the receiving groove of a core catcher 70. Core catcher 70 is mounted upon a swingable arm 71 adapted to rotate about shaft 72. The core catcher is provided with a magnetic member, to be more fully described hereinbelow, so as to retain the core upon catcher 70 and rotate it through an arc, shown by phantom line 73, to position the bottom end of the core immediately above the enlarged upper end of the filter element. The magnetic member, as will be more fully described hereinbelow, has a magnetic attraction to the core element of a magnitude sufficient to hold the core upon the core catcher 70 once deposited thereon.

The core catcher remains in the vertical to a time sufficient to allow core pusher plunger 93 to drive the core into the filter. Plunger 93 is part of a core pusher piston assembly comprised of cylinder 91, piston rod 92 and plunger element 93 secured to the lower end thereof. Activation of cylinder 101 causes piston rod 92 to be moved linearly in the downward vertical direction whereupon plunger 95 moves from the solid line position to the dotted line position 93' thereby pushing the core element off of core catcher 70 and completely into the filter element. Relative spacing between the top of platform 48' (shown in dotted fashion in FIG. 2) and the bottom surface of plunger 93' is preferably substantially equal to the height of the filter element.

The cylinder 10 is then operated to lift piston arm 102 and hence plunger 103 vertically upward and away from upright wand 31 whereupon core catcher 70 returns to the upright position and wand 31 is rotated about shaft 32 from position 31' to position 31".

The diameter of the widened portion 31c of wand 31 is chosen to be slightly less than the inner diameter of the core element so that the completely assembly of the core element and filter element are relatively loosely positioned on wand 31 and supported by platform 48′. The angular acceleration of the wand from position 31′ to position 31″ is sufficiently abrupt so as to cause the completed assembly to be "cast" off of the wand and into a suitable collection bin, whereupon the above-mentioned steps are successively repeated.

The wand assembly is operated by means of a cam 55 mounted to rotate about shaft 56 (see FIG. 2). The cam has a cardiod shaped cam surface 55b. A follower arm 57 mounted to pivot about a pin 58 secured to the machine frame is fitted with a free-wheeling roller 59 pivoted to arm 57 by means of a pin 59a. The lower free end of follower arm 57 has a linking arm 63 secured thereto. Arm 63 is pivotally linked to a short arm 64 having an opening in its right-hand end cooperating with an opening in arm 63 and receiving a pin 65. The opposite end of arm 64 is pivotally connected to a link 66 by pivot pin 67. Link 66 is bifurcated at its free end to define an elongated slot 66a having a circular opening 66b intermediate the ends of slot 66a. The circular shaped opening 66b embraces one end of shaft 32 (note also FIG. 2b) and is locked thereto by means of fastening member 67 which passes through a clearance opening 66c in one arm 66d of the bifurcated portion of link 66 and which threadedly engages a tapped opening 66e provided in the other arm 66f of the bifurcated portion of link 66, which tapped opening 66e is coaxially aligned with clearance opening 66c. By tightening fastener 67, link 66 is locked to shaft 32 so as to impart rotation thereto.

Cam member 55 is adapted to rotate in the counter-clockwise direction as designated by arrow 55a. Initially, the follower arm roller 59 occupies the position shown in FIG. 2 wherein the roller 59 is positioned within the recessed portion of the cam surface. A plurality of tension springs 69 have their left-hand ends mounted to pin 65 and their right-hand ends mounted to a stationary block 75 to urge the roller 59 against cam surface 55b.

With the follower arm 59 nesting in the recess of cam 55, the wand occupies the take-off position 31″. The cam rotates to swing follower arm 57 in the counter-clockwise direction as shown by arrow 76 about its pivot pin 58 causing link 66 to be moved to the dotted line position 66′ returning the wand to the upright position designated by numeral 31′ in readiness for receiving the next filter element. Once the filter element is deposited on wand 31 and supported by platform 48′, the core is deposited upon the wand and at least partially into the widened upper end of the filter element whereupon plunger 103 pushes the core element completely into the filter element. Thereafter the plunger 103 returns to its uppermost position at which time came 55 cause the wand to abruptly swing downwardly towards the take-off position 31′. The follower arm is caused to follow the cam surface by virtue of the tension springs 69. The abrupt movement of the follower arm is attenuated by means of a resilient block 77 secured to the lower end of follower arm 57 and a cooperating snubber assembly 78 secured to stationary block 75 so as to dampen the impact of the follower arm as it returns to the solid line position.

Figure 3B:
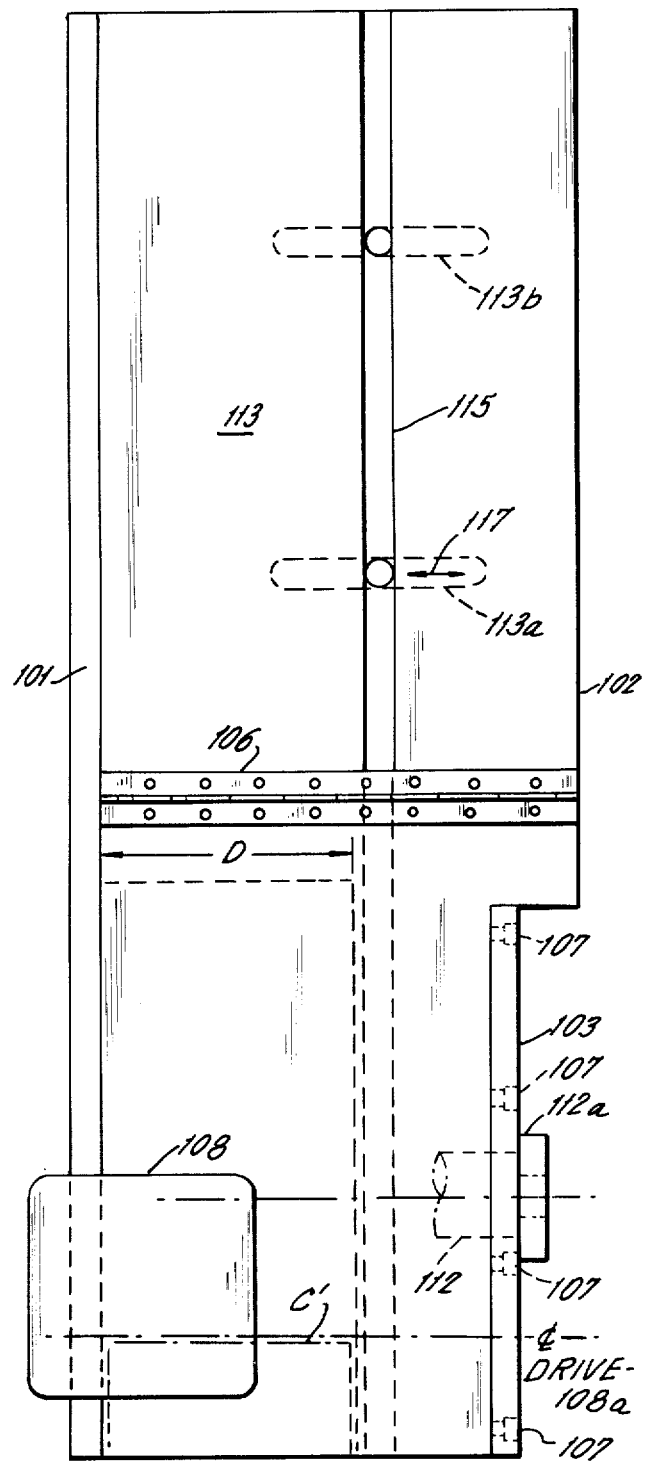
FIG. 3b shows a side view of the assembly of FIG. 3a looking in the direction of arrow 3b.
Figure 3A:
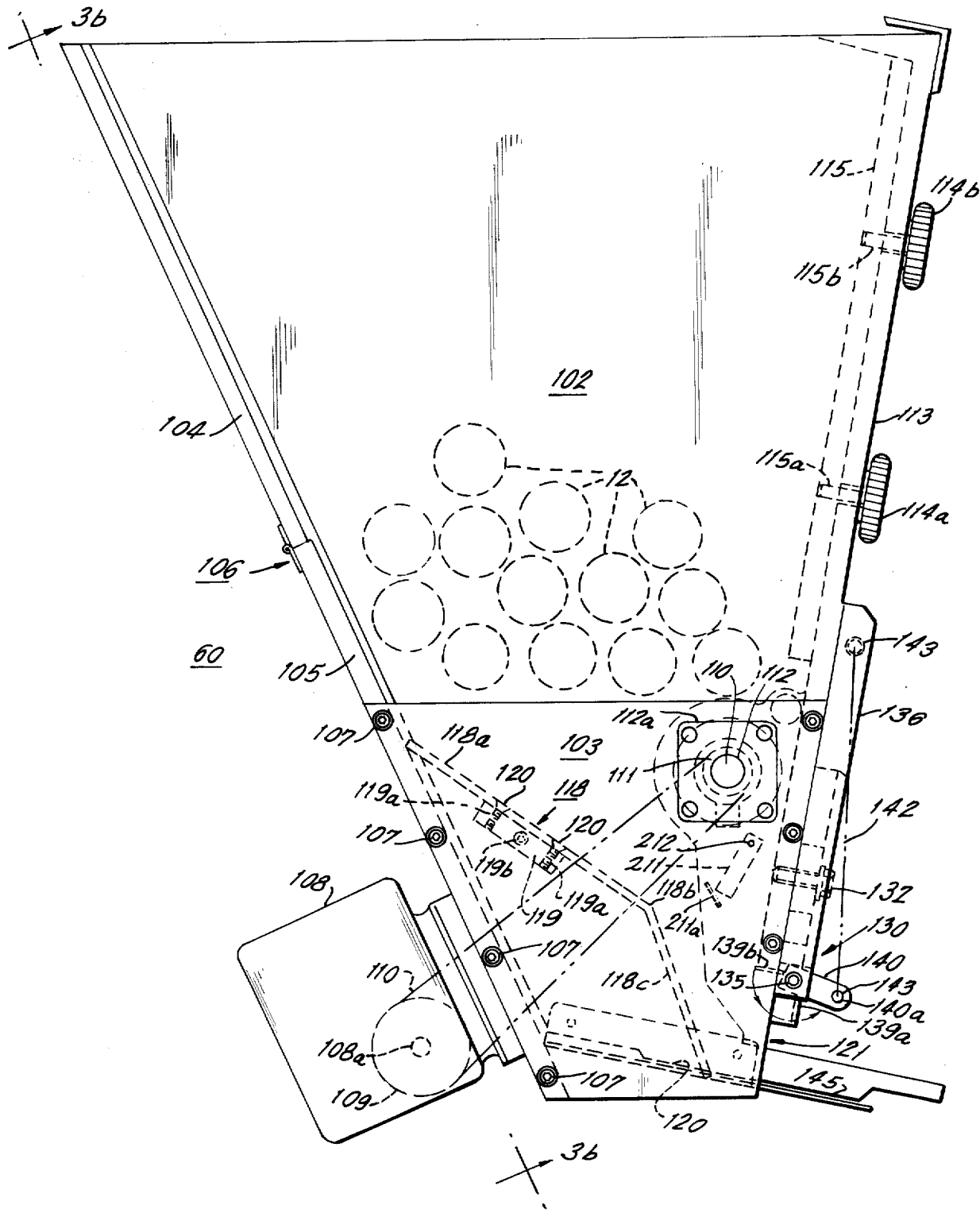
FIG. 3a shows a detailed elevational view of the core hopper assembly of FIG. 2.

FIGS. 3a and 3b show side and front elevational views of the core element hopper assembly 60 which is comprised of a left-hand side plates 101 and an upper right-hand side plate 102. The lower end of the hopper is provided with a lower right-hand side plate 103 spaced inwardly from upper side plate 102, as can best be seen in FIG. 3b. The left-hand end of the hopper assembly relative to FIG. 3a is comprised of a stationary substantially rigid upper sheet 104, preferably formed by Plexiglas, joined to a lower portion 105 by means of a piano hinge assembly 106 so as to enable the lower portion 105 to be swung open for inspection and/or maintenance purposes. When in operation, lower plate 105 is secured to side plate 103 by fasteners 107. The lower portion of plate 105 serves as a mount for motor 108 having an output shaft 108a for rotating drive pulley 109 secured thereto. A timing belt 110 is entrained about pulley 109 and a smaller diameter pulley 111 locked on agitator shaft 112 of an agitator assembly having a mounting pad 112a provided with openings for receiving suitable fasteners to secure the agitator structure thereto.

The opposite (preferably transparent) end wall 113 of the hopper assembly 60 is provided with a pair of hand-operated rotatable knobs 114a and 114b having threaded portions 114c and 114d which threadedly engage tapped openings 115a and 115b in baffle plate 115 (note especially FIG. 3b). End wall 113, as shown best in FIG. 3b, is provided with a pair of enlongated slots 113a and 113b through which the threaded portions of hand wheels 114a and 114b extend so as to permit the baffle plate to be moved either to the left or to the right, as shown by double-headed arrow 117 in FIG. 3b, to adjust the bin to the length of the cores presently being deposited in the hopper. For example, the distance D (see FIG. 3b) between side wall 101 and baffle plate 115 represents one typical setting for core elements, one such core element C′ being shown as positioned in the bottom of the hopper.

A thin plate 118 is provided within the interior of the hopper assembly and has an upper portion 118a integrally joined to a lower portion 118c by bend 118b. The upper portion 118a of plate 118 is secured to the end walls 101 and 103 by means of a pair of solid rectangular shaped blocks 119 (only one of which is shown in FIG. 3a for purposes of simplicity) each having a pair of tapped openings 119a for threadedly engaging fasteners 120 to secure upper plate portion 118 to block 119. Block 119 is further provided with a tapped opening 119b arranged perpendicular to openings 119a for receiving a threaded fastener to secure block 119 to wall 103. It should be understood that a pair of blocks are provided along opposite sides of upper plate portion 118a to respectively secure plate 118 to walls 103 and 101 (note especially FIG. 3b).

An adjustable baffle 211 is pivotally mounted to the hopper by a tapped rod 212. The free end 211a of baffle 211 is displaced from plate 118 by a distance selected to control the flow of cores through the opening defined by plate 118 and baffle 211 to prevent cores from filling the area therebeneath and thereby impede the delivery of cores to the core catcher. Once adjusted, the baffle is locked in place by tightening rod 212.

The lower plate portion 118c extends downwardly to the base or floor 120 of the hopper which is provided with an exit opening 121 for sequentially dispensing core elements.

A feed vane assembly 130 is secured to wall 113 to provide for sequential feeding of the core elements.

FIGS. 3c, 3d, 3e and 3f will now be considered in conjunction with FIG. 3a in which the feed vane assembly 130 is shown as being comprised of a substantially thin, rectangular-shaped plate 131 having a pair of elongated slots 131a and 131b for receiving fasteners such as, for example, fastener 132 shown in FIG. 3a, to secure plate 131 to side wall 113. A member 133 is secured to the left-hand side of plate 131 (relative to FIG. 3d) and is provided with a pair of clearance openings 133a and 133b for receiving threaded fasteners 134 which pass through the clearance openings and threadedly engage tapped openings 131c and 131d in plate 131. The lower end of member 133 is provided with an opening 133c for supporting the left-hand end of a shaft 135.

A member 136 is secured to the right-hand end of plate 131 (relative to FIG. 3d) and is provided with a pair of clearance openings 136a and 136b for receiving threaded fasteners 137 which threadedly engaged tapped openings 131e and 131f in plate 131 to secure member 136 thereto. The lower end of member 136 is provided with an opening 136c for receiving the right-hand end of shaft 136.

A vane assembly is welded to shaft 135 as shown by weldments 138 and is comprised of a substantially L shaped vane structure bent about its center portion 139a to form arms 139b and 139c. The right-hand end 135a of shaft 135 extends beyond member 136 (see FIG. 3d) and has secured thereto an actuating arm 140 (see FIG. 3a) whose opposite end is provided with an opening 140a for securement to one end of a piston rod forming part of an air cylinder assembly shown in schematic fashion by phantom line 142 for purposes of simplicity. The air cylinder assembly is similar to the assembly 36 shown in FIG. 2b. The upper end of the air cylinder assembly is secured by a suitable fastening means 143 to the upper end of member 136 while the lower free end of a piston rod forming part of the air cylinder assembly is pivotally coupled to actuating arm 140 by means of a pin 143.

The air cylinder assembly 142 acts along the phantom line designated by the same numeral (142) causing shaft 135 to rotate in a counterclockwise direction relative to FIG. 3a and move a core embraced by the arms 139a and 139b out upon the feed ramp 145 so as to roll down along the feed ramp and onto the core catcher, to be more fully described. The air cylinder is then activated to return to the position shown in FIG. 3a in readiness for receipt of the next core element. It should be understood that sufficient clearance is provided between the confronting surface of plate portion 118c and the free edge of arm 139b to permit a core element to pass therebetween and be embraced by arms 139a and 139b. However, the clearance distance between the free end of arm 139a and feed ramp 145 is less than the diameter of a core element so as to prevent another core element from being fed to feed ramp 145 until the next activation of the piston assembly 142. The agitator assembly under control of motor drive 108 serves to agitate or vibrate the hopper assembly and "shake" the core elements stacked in the hopper downwardly toward the hopper vane assembly. The top end of the hopper assembly is opened to facilitate the loading cores into the hopper. The transparent portions of the hopper facilitate inspection of the hopper contents.

FIG. 4 shows an elevational view of the core catcher actuator assembly which is comprised of cam 150 mounted upon shaft 151. A substantially "V" shaped follower arm 152 is pivoted at its left-hand end by pin 153 which is secured to the machine frame. A free wheeling roller 154 is mounted upon follower arm 153 by pin 155. The free end of follower arm 152 is pivotally connected to a rod 156 by pin 157. An elongated tension spring 158 has its upper end secured to pin 157 and its lower end secured to a mounting point 159 provided on the machine frame. The tension spring has been shown in schematic fashion as represented by a phantom line for purposes of simplicity.

The upper end of rod 156 is pivotally connected to a link 160 by means of pivot pin 161. The opposite end of link 160 has a bifurcated configuration comprised of arms 160a and 160b substantially identical to the link 66 of FIG. 2. Each of the arms is provided with a substantially semi-circular groove 160c and 160d, respectively, for embracing shaft 72, also shown in FIG. 2. Arm 160a is provided with a clearance opening 160e while arm 160b is provided with a tapped opening 160f, which openings respectively receive and threadedly engage fastener 162 for securing link 160 to shaft 72.

The core catcher 70, as shown in detail FIGS. 4a–4d, is comprised of a pair of rigid members 163 and 164 each of which has an opening 163a and 164a for receiving shaft 72. Radially aligned openings 163b and 164b are adapted to receive a fastener 173 (see FIG. 4b) for securing members 163 and 164 to shaft 72.

A second pair of plates 166 and 167 are provided with clearance openings 166a and 167a for receiving threaded fasteners 165a which treadedly engage tapped openings 163c and 164c in members 163 and 164. The upper ends of plates 166 and 167 are provided with clearance opnings 166b and 167b for receiving fasteners 165b which threadedly engage tapped openings 168a and 169a in upper members 168 and 169. Members 168 and 169 are each provided with curved surfaces 168b and 169b which collectively substantially form a semi-circular shaped cradle for receiving a core element. The top surfaces 169g of member 169 is higher than the top surface 168e of member 168 to prevent a core from rolling off of the core catcher as it is dispensed from the hopper. Member 169 is provided with an elongated circular shaped bore 169d for receiving an elongated cylindrical rod 170 (not FIGS. 4a, 4c and 4d) which is provided with an off-centered opening 170a for receiving a rod shaped elongated permanent magnet 171. A portion of cylinder 170 and a portion of curved section 169b are preferably broken away to a position magnet 171 along a tangent to curved surface 169b. A pair of threaded fasteners 172 engage tapped apertures 169e and 169f in member 169 to lock metallic non-magnetic cylinder 170 in opening 169d.

Considering FIG. 4, roller 154 on follower arm 152 is urged by spring 158 to follow the cam surface 150a of cam member 150 and thereby move the cradle portion of core catcher assembly 70 between the horizontal solid line position in FIG. 4 to the vertical dotted line position 70'. When the core catcher is in the solid line position 70, the piston cylinder assembly 142, shown in FIG. 3a, dispenses a core element downwardly along ramp 145 and onto core catcher 70. Magnetic member 171 magnetically attracts the core element to maintain the core element against the curved surfaces 168b and 169b (see FIG. 4a). Rotation of cam 150 drives the core catcher from the solid line position 70 to the dotted line position 70' to position the core immediately above the upper end of the wand which is in the upright position 31′, as shown in FIG. 2. Cam 150 is timed to move core catcher 70 from the solid line position 70 to the vertical 70′ of FIG. 4 to move the core on core catcher 70 in the path of plunger 93, shown in FIG. 2, the timed actuation of cylinder 101 drives the piston rod 102 and plunger assembly 103 downwardly to drive the core element into the enlarged opening of the filter element. Thereafter core catcher returns to the solid line position 70 and plunger 93 returns to the uppermost position preparatory to the next core insertion operation.

Considering FIGS. 1a, 2 and 2b cam 55 is provided with a tapped aperture for receiving a free wheeling roller 176 secured to cam 55 by fastener 177. A pair of stationary mounted air valve controls 178 and 179 having reciprocating actuator noses 178a and 179a are secured to a stationary portion of the machine frame (not shown for purposes of simplicity). As the cam 55 rotates in a counterclockwise direction, roller member 176 engages reciprocating nose 178a to activate (i.e. "open") a valve 201 enabling air pressure source 200 to introducing air under pressure into inlet opening 91a of cylinder 91 to drive the plunger downwardly. Continued rotation of the cam 55 releases nose 178a to close valve 201 and thereby cut off the air supply to opening 91a. After a predetermined time delay, roller 176 engages reciprocating nose 179a causing air control valve 179 to open valve 202 to introduce air under pressure into opening 91b of cylinder 90 causing piston rod 92 and hence plunger 93 to be rapidly moved in the upward vertical direction preparatory to the next core insertion operation.

Cam member 150 of FIG. 4 is provided with a similar arrangement in which a pair of stationary mounted air valve controls 181 and 182 are secured to the machine frame so as to be mounted in a stationary fashion. Each of the valve controls are provided with reciprocating noses 181a and 182a, respectively, which are adapted to be rollingly engaged by a roller 184 rollably mounted to cam 150 by fastener 185. As cam 150 rotates roller 184 rollingly engages reciprocating nose 181a to actuate air valve control 181 so as to open valve 204 enabling air under pressure from source 203 to enter into opening 36f in cylinder 36c of cylinder assembly 36, shown best in FIG. 2b. This causes the piston rod 36d to move upwardly and hence activate the squeezer mechanism, shown best in FIGS. 2b and 2c, for squeezing the lower end of the filter element whereupon the large diameter portion 31c of wand 31 acts as a fulcrum to cause the upper end of the filter element to be enlarged or widened to facilitate at least partial insertion of a core element into the widened upper end of a filter element.

Continued rotation of cam 150 causes roller 184 to slide away from reciprocating nose 181a to cut off the air supply to opening 36f. Continued rotation of cam 150 causes roller 184 to rollingly engage reciprocating nose 182a causing air under pressure from source 203 to be inserted into opening 36g of air cylinder 36c (see FIG. 2b) to move piston rod 36d generally downwardly in a direction shown by arrow 52a so as to move the squeezer assembly of FIG. 2c downwardly, thereby releasing the pawls 44a–44f from the lower end of the filter element causing the filter element to resume its normal configuration. The pawls are rapidly returned to their normal opened position by means of tension spring 49 which causes the nose 45 of pawl 44f to move substantially vertically upward. This nose engages the nose of pawl 44e causing pawls 44e and 44d to lift upwardly due to the fact that both of these pawls are secured to common shaft 40c. The lifting of the nose 45 of pawl 44d is imparted to the nose of pawl 44c which causes the lifting of nose 44c and 44b which are joined to common shaft 40b. The lifting of the nose of pawl 44b, in turn, lifts the nose of pawl 44a so as to remove the squeezing action applied to the bottom of the filter element and thereby permit the wand assembly to be rapidly swung downwardly towards the take-off position with the velocity of the movement of the wand assembly being sufficient to drive the completed assembly of a core element and filter element into a suitable collection bin.

It can be seen from the foregoing description that the present invention provides a novel automatic method and apparatus for repetitively inserting core element into accordion-pleated fashion and which is capable of completing such assemblies at the rate of more than 40 operations per minute.

Although there has been described a preferred embodiment of this invention, many variations and modifications will now be apparent to those skilled in the art. Therefore, this invention is to be limited, not by the specific disclosure herein, but only by the appended claims.

What is claimed is:

1. A method for utilizing a swingably mounted rod having a widened intermediate portion for inserting a hollow cylindrical core element into an annular shaped accordion pleated filter element which filter element is substantially non-bendable in the axial direction while being capable of expanding in the radial direction, said method comprising the steps of
   a. holding the rod to an upright position;
   b. depositing a filter element upon the rod so that the widened intermediate portion lies intermediate the ends of the filter element;
   c. squeezing the bottom of the filter element whereby the widened portion of the rod acts as a fulcrum to enlarge the upper end of the filter element;
   d. droppping the core element upon said rod and so that the core element at least partially enters the enlarged upper open end of the filter element;
   e. pressing the core element downwardly into the filter element to substantially longitudinally align the core and filter elements;
   f. releasing the bottom end of the filter element to enable the filter element to resume its natural configuration.

2. The method of claim 1 further comprising the step of:
   g. rapidly swinging the rod towards a downward position with sufficient acceleration to cause the assembled elements to be cast off of said rod and into a suitable collection bin.

3. The method of claim 2 further comprising the step of rapidly returning the rod to the upright position preparatory to repeating method steps (a) through (g).

4. Apparatus of automatically inserting core elements into filter elements said core elements comprising a substantially hollow cylindrical shaped member, and said filter elements being generally annular in shape and having an accordion pleated configuration, said apparatus comprising:
   a rod having a first end swingably mounted upon a shaft;

first means for moving said rod between an upright position and a downward takeoff position;

said rod having a widened portion spaced inwardly from its opposite free end;

a platform secured to said rod positioned between said widened portion and said first end;

second means for depositing a filter element upon the free end whereby said platform supports the bottom end of said filter element so that the intermediate portion of the filter element is substantially aligned with the widened portion of the rod;

third means for squeezing the bottom end of said filter element whereby the widened portion of the rod acts as a fulcrum to cause the upper open end of the filter element to become enlarged;

fourth means for moving a core element toward the free end of said rod so that the core element is immediately above the enlarged open end of the filter element;

fifth means for pushing the core element into the filter element so that the core element and the filter element are substantially longitudinally aligned;

said first means rapidly moving said rod towards the takeoff position at an angular velocity sufficient to cast the completed assembly off of said rod and into a suitable collection bin.

5. The apparatus of claim 4 wherein said second means comprises two plural sprocket means;

closed loop chain means entrained about said plural sprocket means;

pusher means arranged at spaced intervals along said chain means for pushing filter elements towards the position occupied by the free end of said rod when in the upright position.

6. The apparatus of claim 5 wherein said second means further comprises a pair of spaced cylindrical rotatable discs coaxially aligned with and embracing one of said sprocket means for guiding the filter elements pushed by said pusher means downwardly towards the position of the free end of said rod when in the upright position.

7. The apparatus of claim 4 wherein said third means further comprises a collar surrounding said rod and adjacent said platform;

a plurality of swingable pawls swingably mounted at spaced intervals about said collar;

the inner ends of said pawls being movable to a first position for engaging the lower end of a filter element and a second position away from said filter element;

means for normally biasing the inner ends of said pawls away from said filter element;

arm means pivotally mounted to said collar for moving said pawl inner ends towards the filter element;

means coupled to said arm means and selectively operable to rotate said arm means in a first direction to cause the inner ends of said pawls to cooperatively squeeze said filter element and to rotate said arm means in a second direction to enable said biasing means to move the inner ends of said pawls away from the filter element.

8. The apparatus of claim 4 further comprising;

a downwardly tapering hopper for receiving a plurality of core elements and gravity feeding the core elements toward the bottom end of the hopper;

said hopper having an outfeed opening at the bottom end;

means for sequentially dispensing said core elements through said outfeed opening;

a pivotally mounted cradle having an end surface for receiving and supporting a core element;

means for moving said cradle between upright position beneath said outfeed opening for receiving a core element and for subsequently moving the cradle downwardly towards the position occupied by the free end of the rod when in the upright position to move the core element above said rod.

9. The apparatus of claim 8 further wherein said cradle further comprises a permanent magnet member positioned in a slot provided in the grooved surface of the cradle for magnetically attracting a core element deposited upon said grooved surface.

10. The apparatus of claim 8 further comprising means for continuously agitating at least the bottom end of said hopper to facilitate feeding of the core elements towards said outfeed opening.

11. The apparatus of claim 4 wherein said first means further comprises a rotatable cam;

said rod being pivotally mounted upon a shaft;

a follower arm having a pivotally mounted first end;

a roller rotatably mounted upon said follower arm;

spring means for urging said roller into rolling engagement with the surface of said cam;

linkage means pivotally connected between said shaft and the opposite end of said follower arm for selectively moving said rod between said upright and said take-off positions responsive to rotation of said cam.

12. The apparatus of claim 8 wherein said fourth means further comprises a rotatable cam;

a follower arm having a pivotally mounted first end;

a roller rotatably mounted upon said follower arm;

spring means for urging said roller into rolling engagement with the surface of said cam;

linkage means pivotally connected between said cradle and the second free end of said follower arm for selectively moving said cradle between said upright and said downward positions.

13. The apparatus of claim 11 wherein said cam has a cardioid shaped periphery.

14. The apparatus of claim 4 wherein said fifth means comprises air cylinder means having a reciprocating piston rod, a plunger member secured to said piston rod for engaging the core element when the piston rod is driven towards said core element.

15. The apparatus of claim 11 further comprising roller means rotatably mounted to said cam means;

first and second control means positioned to be selectively engaged by said roller means for controlling said fifth means.

16. The apparatus of claim 12 further comprising rotatable roller means mounted to rotate with said cam means;

first and second control means positioned to be selectively engaged by said roller means for controlling said third means.

* * * * *